UNITED STATES PATENT OFFICE.

FRANZ RICHARD THOMÄ, OF LEIPZIG, AND OSCAR PANNICKE, OF DELITSCH, GERMANY.

PROCESS FOR POLISHING CEMENT TILES.

1,034,324.

No Drawing.

Specification of Letters Patent. Patented July 30, 1912.

Application filed March 4, 1911. Serial No. 612,380.

*To all whom it may concern:*

Be it known that we, FRANZ RICHARD THOMÄ and OSCAR PANNICKE, the first a subject of the King of Saxony, and the second a subject of the King of Prussia, residing at Leipzig and Delitsch, in the Kingdom of Saxony, Germany, respectively, have invented certain new and useful Improvements in Processes for Polishing Cement Tiles, of which the following is a specification.

Cement tiles have up to the present been used only for paving the floors; they have scarcely ever been used for covering walls as it has been very difficult to polish such tiles.

In order to polish a cement tile properly the surface of the tile has to be prepared in such a manner that it not only takes the polish but also keeps the same for thus rendering the tile weatherproof.

This invention relates to an improved process for polishing cement tiles.

The tiles treated according to the improved process show such a perfect polish as up to the present has never been obtained with cement tiles. This polish is not only of very fine appearance but also of great durability. The colors of the plate which generally with cement tiles appear rather dull are very brilliant.

The improved process is as follows:—For the manufacture of cement tiles to be polished Portland cement of very good quality has to be used. For coloring the cement tiles there must not be used ultramarine or green ultramarine, as these colors would alter under the influence of the compositions used for carrying out the improved polishing process.

A principal part of the process consists in well hardening the surface of the cement. With this object in view the tiles are treated during two to three days and once or twice every day with a solution of 1 kilogram of magnesium fluohydrate and 4 liters of water; the tiles are well impregnated with this solution and then left to dry. After the tiles have dried they are ground and polished. For the grinding of the cement tiles the following solution is used:—375 grams of shellac are gradually molten, 650 grams of emery No. 00 and 25 grams of bi-oxalate of potassium are added under continuous stirring.

The polishing stone is prepared by melting 400 grams of shellac in an enameled pot; to this shellac, which is being continuously stirred, 600 grams of emery No. 0000, 100 grams of sublimated sulfur and 50 grams of borax of best quality are gradually added. The solution is then poured into a wooden mold and left to cool.

For producing the high polish on the cement tiles a polishing powder is used which is composed of 5 parts of sublimated sulfur and of 1 part of tin-putty which are intimately mixed in the mortar. The cement tile is rubbed with this powder by means of a piece of felt until the perfect polish is obtained. When the polishing powder is being put on the plate some drops of water are preferably added.

We claim:—

An improved process for producing a weatherproof high polish on colored cement tiles, consisting in coloring the tile made from Portland cement of good quality, in impregnating the colored tile with a solution composed of 1 kilogram of magnesium fluohydrate diluted in 4 liters of water, in leaving the impregnated tiles to dry and in rubbing the same after they have dried with a composition of shellac, emery, and oxalate, in polishing the tiles by means of a composition of shellac, emery, sublimate of sulfur and borax, and in repolishing the same with a powder composed of sublimate of sulfur and tin-putty.

In witness whereof we have hereunto set our hands in the presence of two witnesses.

FRANZ RICHARD THOMÄ.
OSCAR PANNICKE.

Witnesses:
ALBERT R. MORAWETZ,
RUDOLPH FRICKE.